United States Patent

[11] 3,610,591

[72] Inventor Giovanni C. Ziliotto
 120 South Broadway, Lake Orion, Mich. 48035
[21] Appl. No. 827,357
[22] Filed May 23, 1969
[45] Patented Oct. 5, 1971

[54] WATERFALL ATOMIZER
 4 Claims, 2 Drawing Figs.

[52] U.S. Cl. .................................................. 261/112,
 261/DIG. 54, 55/223, 55/240
[51] Int. Cl. ............................................... B01d 47/00
[50] Field of Search........................................... 55/223,
 240; 261/76, 78.1, DIG. 54, 108, 109, 110, 111, 112

[56] References Cited
 UNITED STATES PATENTS
 3,057,700 10/1962 Gross .......................... 261/DIG. 54

3,372,530 3/1968 Zimmer....................... 261/116 X
 FOREIGN PATENTS
 197,096 7/1965 Sweden ...................... 261/DIG. 54

Primary Examiner—Tim R. Miles
Assistant Examiner—Steven H. Markowitz
Attorney—Harness, Dickey & Pierce ABSTRACT: The intake passageway of the device has converging walls through which a gas passes and over which a flow of water is maintained which cools the gases and retains the walls clean. Certain types of dust and grime in the gas are difficult to wet for removal, and a series of rods in rows in extension of the sloping walls are struck by the flow of water therefrom which breaks up into droplets at the point where the gas expands to mingle with the gas and wet the hard-to-remove particles so that they can be separated more readily therefrom.

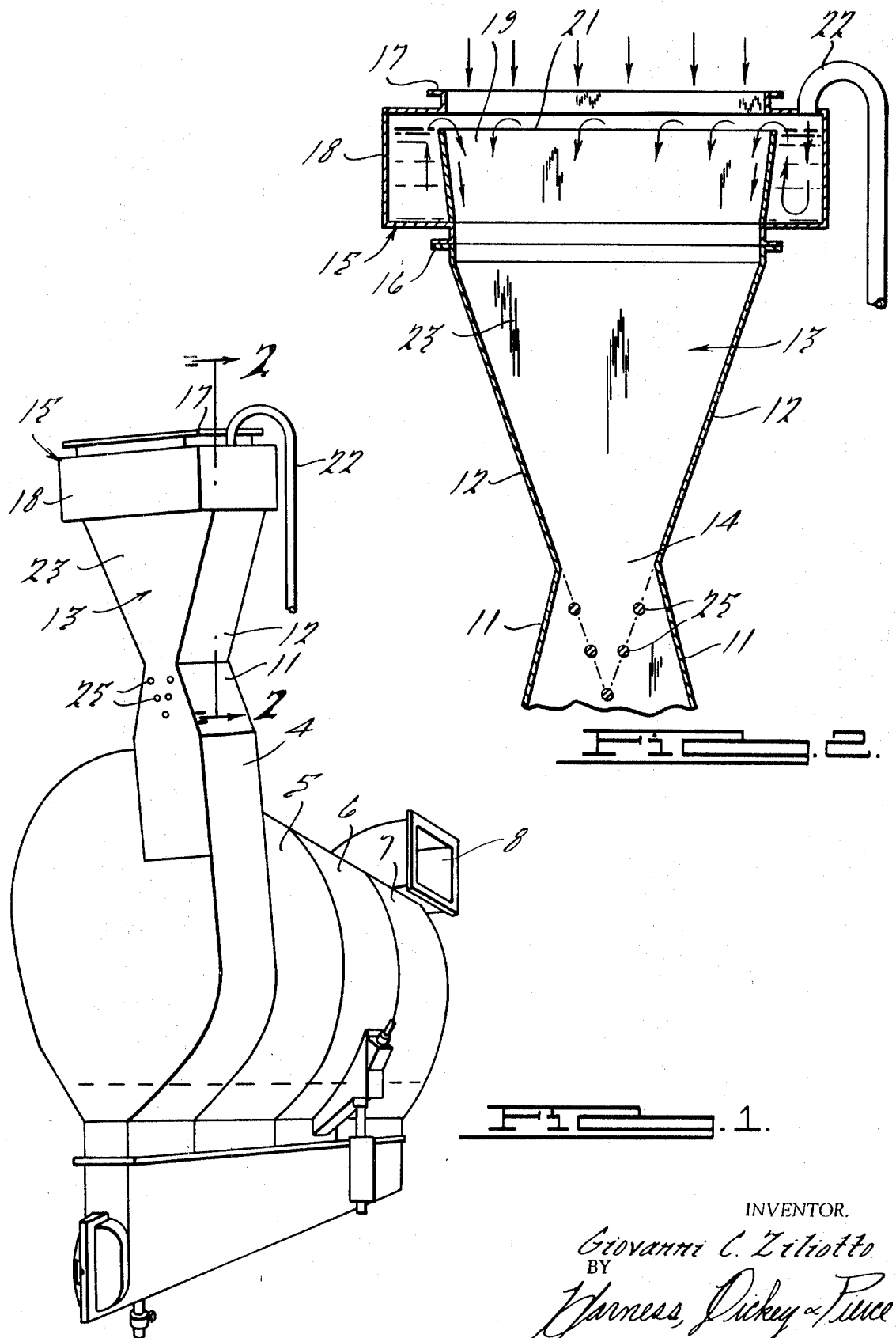

WATERFALL ATOMIZER

BACKGROUND OF THE INVENTION

There is no known art which treats the flow of gas in the manner as recited above and it is felt that the device of the present invention is new.

RELATED APPLICATION

Reference may be had to applicant's U.S. Pat. No. 3,429,334, issued Feb. 25, 1969, for the disclosure of a device to which the present invention is applied.

SUMMARY OF THE INVENTION

The patent discloses a gas cleaner of the wet collector type which separates the dust and dirt particles from the air by centrifugal action as the water wets and removes the particles from the gas. The device has an inlet and outlet connected by a helical conduit through which the air is blown or drawn to have it contact a surface of water located in the helical path. The device of the present invention forms an extension at the inlet opening and provides a venturi effect on the entering gas by having a pair of opposite sides of the device slope inwardly toward each other and form a reduced opening at the end of the restricted passageway. A tank of water is provided above the intake end of the device for the admission of a predetermined flow of water over the inner walls thereof. This water cools the gas and maintains the walls free of the entrained dust and dirt particles.

Substantially aligned with the sloping walls and below the reduced opening, a set of rods are provided parallel to the sloping wall and preferably in rows in the path of the water cascading from the walls at the reduced opening. Below the opening, the gas is free to expand at the point where the rods are mounted and on which the water will break up into particles so that it can intimately mingle with the expanding gas and thereby more readily wet the particles therewithin so that they will readily separate therefrom when passing through the collector.

BRIEF DESCRIPTION OF THE DRAWING

FIG. 1 is a view of an air-cleaning device having the gas atomizer device of the present invention applied thereto; and FIG. 2 is an enlarged section of the structure illustrated in FIG. 1, taken on the line 2—2 thereof.

DESCRIPTION OF THE PREFERRED EMBODIMENT

As described more specifically in the above set forth patent, the separator has an inlet 4 at the entrance end of a duct containing a plurality of helical turns 5, 6 and 7 which terminate in an outlet end 8. A water level is maintained in the bottom of the helical turns for wetting the gas and the entrained particles which move outwardly against the outer wall thereof. The wetting of the particles within the gas causes the particles to move from the gas onto the wall and move therefrom into the water in the separator where they collect and from which they are removed.

The present invention pertains to the atomizing device which is mounted above the intake conduit to the collector which produces droplets of water that forcibly impinge on the particles in the gas as it is expanding during its passage into the collector. As illustrated in FIG. 2, an intake conduit 10 has its sidewalls 11 sloping inwardly and attached to sidewalls 12 of the atomizing device 13 to form a restricted opening 14 at the point of juncture therewith. A water tank 15 is secured by a flange 16 to the upper end of the atomizer 13, the top end having a flange 17 which is connectable to an intake conduit for the gas (not shown). The tank 15 is of rectangular shape having a trough 18 provided with an inner wall 19 over the edge 21 of which the water from the trough will flow. Water is continuously delivered to the trough through a delivery pipe 22 at a controllable rate. The water flows down the sidewalls 12 as well as the end walls 23 to keep the surfaces clean and to cool the gas entering the collector. The air, passing down between the walls 12, will be compressed to a degree by the time it passes through the opening 14 and its velocity will thereby increase.

Below the restricted opening 14 the gas will expand and the water cascading from the walls 12 will strike a plurality of rods 25 which are positioned in two rows in planes which are in angular relation to each other. The cascading water which strikes the rods 25 will be broken up into droplets which will readily intermingle with the expanding gas and thereby wet the particles entrained therein. This initial wetting of the particles assists in separating them from the gas when they impinge on helical walls of the collector. The ends of the rods are supported in the end walls 23 and extend below the restricted opening in the path of the water flowing over the walls 12. The rods are mounted in two rows in angular relation to each other or otherwise related so as to be in the path of flow of the water as it leaves the walls 12. The rods not only break up the water into droplets but also provide turbulence to the gas as it expands, causing the comingling of the droplets therewith and the initial wetting of the entrained particles.

Any plurality of rods with some variation in their relationship to each other may be used below the throat of the venturi to meet the different air conditions and the difference in size of the throat opening. The water introduced at the top of the venturi tube will have substantially the same velocity as that of the air when passing from the throat at the bottom of the tube. For this reason there can be little impact between the dust and the water even though some of the water breaks up into small droplets. The water velocity is reduced in the vertical direction when compelled to move laterally upon striking the rods in its path of flow below the venturi throat. This reduction in the water velocity in the vertical direction and the presence of the lateral component of movement thereof creates an impact between the dust particles and the water, a large portion of which is in droplet form. Experiments have shown a remarkable increase in efficiency in the dust-collecting process when the rods are employed as compared to tests run on the same structure with the same amount of water and with the rods omitted.

I claim:

1. In a waterfall atomizer,, an intake conduit for a flow of gas having sidewalls and end walls, sidewalls converging toward each other forming a restricted opening at the bottom, a tank for water at the top of the conduit having a shorter inner wall over which the water from a surrounding trough portion flows, and a plurality of rods within the conduit supported thereby below said restricted opening in the path of flow of water from said sidewalls the gravity flow of which strikes the rods and produces droplets for wetting particles in the gas.

2. In a waterfall atomizer as recited in claim 1, wherein said rods are supported by the end walls in parallel relation to the sidewalls.

3. In a waterfall atomizer as recited in claim 2, wherein the rods are mounted in two rows in planes that are angular relation to each other.

4. In a waterfall atomizer as recited in claim 3, wherein the planes in which the rods are disposed are located substantially in the planes of the sidewalls.